(12) United States Patent
Sullivan et al.

(10) Patent No.: US 7,024,294 B2
(45) Date of Patent: Apr. 4, 2006

(54) VEHICLE SEAT OCCUPANT STATUS CLASSIFICATION USING MULTIPLE SENSORS

(75) Inventors: Stuart S. Sullivan, Peru, IN (US); James F. Patterson, Greentown, IN (US); Morgan D. Murphy, Kokomo, IN (US); Charles A. Gray, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 212 days.

(21) Appl. No.: 10/653,698

(22) Filed: Sep. 2, 2003

(65) Prior Publication Data

US 2004/0080425 A1 Apr. 29, 2004

Related U.S. Application Data

(60) Provisional application No. 60/408,039, filed on Sep. 4, 2002.

(51) Int. Cl.
*B60R 22/00* (2006.01)
*E05F 15/00* (2006.01)
*G05D 1/00* (2006.01)
*G05D 3/00* (2006.01)
*G06F 17/00* (2006.01)

(52) U.S. Cl. .................. 701/45; 340/420; 340/667; 340/571; 340/825.75; 280/735; 180/273; 702/43

(58) Field of Classification Search .............. 701/45; 340/420, 667, 571, 825.75; 280/735; 180/273; 73/862.391; 702/43
See application file for complete search history.

(56) References Cited

U.S. PATENT DOCUMENTS

| | | | |
|---|---|---|---|
| 6,012,007 A | 1/2000 | Fortune | |
| 6,151,540 A | 11/2000 | Anishetty | |
| 6,246,936 B1 | 6/2001 | Murphy et al. | |
| 6,438,476 B1 | 8/2002 | Gray et al. | |
| 6,438,477 B1 | 8/2002 | Patterson et al. | |
| 6,479,766 B1 | 11/2002 | Gray et al. | |
| 6,542,802 B1 | 4/2003 | Gray et al. | |
| 6,578,871 B1 | 6/2003 | Gray et al. | |
| 6,587,770 B1 | 7/2003 | Gray et al. | |
| 6,889,146 B1 * | 5/2005 | Sullivan et al. ............... 702/43 |
| 2003/0209893 A1 * | 11/2003 | Breed et al. ................. 280/735 |
| 2004/0079176 A1 * | 4/2004 | Sullivan et al. ........ 73/862.391 |

* cited by examiner

*Primary Examiner*—Thomas G. Black
*Assistant Examiner*—McDieunel Marc
(74) *Attorney, Agent, or Firm*—Stefan V. Chmielewski

(57) ABSTRACT

A multiple sensor, vehicle seat occupant status determination system uses dynamic variations in occupant responsive sensor output due to accelerations of the vehicle seat to discriminate via a statistical method between sensors that are failed and those that are operating correctly and eliminates the contribution of signals detected as not valid from the status determination. If and only if the maximum and minimum sampled signal values of at least one of the received signals span upper and lower control reference values derived from the sampled signal values, a variance value for each of the signals is derived; and one or both of the greatest two or the smallest two variance values are checked against a relative size factor to detect an outlier signal value. If an outlier signal value is detected more than a predetermined number of consecutive times, the status classification is performed without signal values from the outlier sensor.

2 Claims, 5 Drawing Sheets

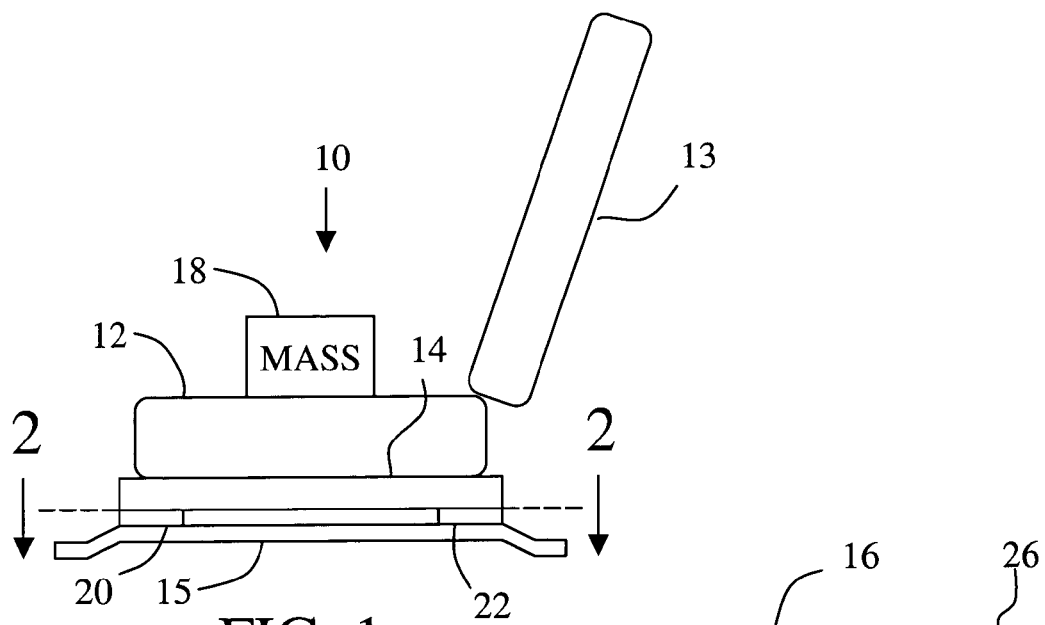
FIG. 1
FIG. 2
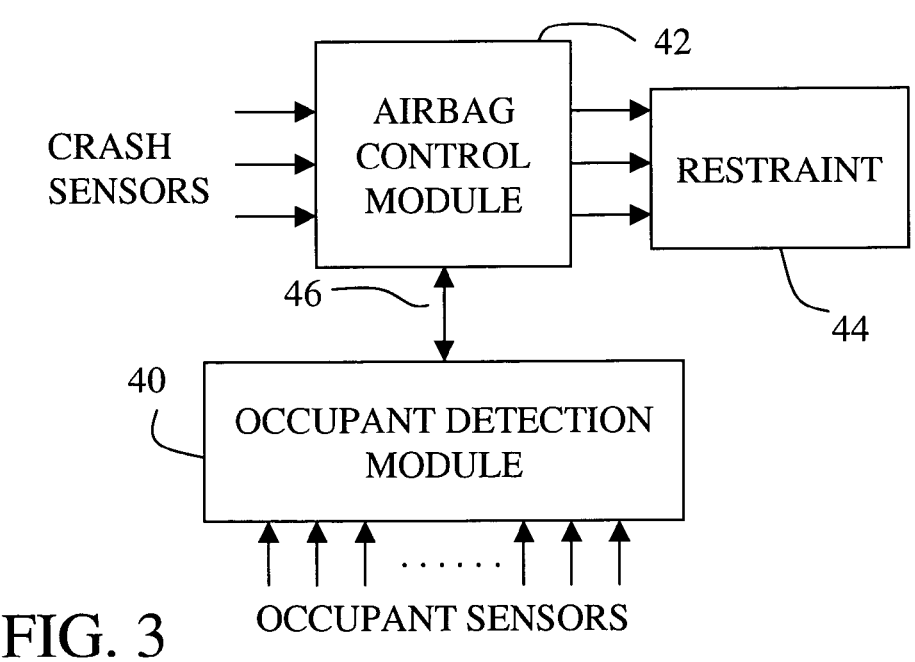
FIG. 3

VEHICLE SEAT OCCUPANT STATUS CLASSIFICATION USING MULTIPLE SENSORS

RELATED APPLICATIONS

This application is related to U.S. Provisional Application No. 60/408,039, filed Sep. 4, 2002, and to U.S. patent application Ser. No. 10/653,463, entitled Seat Belt Tension Determination Using Multiple Seat Belt Tension Sensors, filed on the same date as this application.

TECHNICAL FIELD

The technical field of this invention is vehicle restraint systems.

BACKGROUND OF THE INVENTION

A vehicle seat occupant status classification system uses sensors in or associated with the seat to detect physical variables indicative of the presence, position, weight, capacitance or other physical characteristics of a seat occupant, in order to help decide whether or not to deploy a passive restraint such as an airbag during a crash event. These sensors are subject to failures during the useful life of the vehicle, the number of such failures being limited, but impossible to totally eliminate, in spite of the best known quality control. Some such failures may of the "stuck" sensor type, wherein the sensor itself is operable but cannot read the true value of the physical characteristic due, for example, to an object wedged under the seat. Others may be due to an electrically or mechanically failed sensor producing a floating signal having no relationship to the physical characteristic. The use of multiple, and to some extent redundant, sensors can provide the system with a reasonable level of operability even with one or more sensors failed or otherwise not providing an accurate output signal; but system performance may be somewhat degraded as a result.

SUMMARY OF THE INVENTION

This invention provides detection of individual failed sensors in a multiple sensor, vehicle seat occupant status classification system. The invention makes use of dynamic variations in sensor output due to accelerations of the vehicle seat to discriminate via a statistical process control method between sensors that are failed and those that are operating correctly; and further eliminates the contribution of signals detected as failed from the final status classification.

The method and apparatus of this invention determines a classification of a vehicle seat occupant by receiving signals for a predetermined time from a plurality of sensors responsive to a physical characteristic of an occupant at diverse locations on a vehicle seat apparatus, determining a vehicle seat occupant characterization from the received signals in a predetermined classification process, and deriving maximum and minimum sampled values of each of the received signals during the predetermined time and comparing the derived maximum and minimum sampled values for each of the received signals to defined upper and lower control reference values.

If and only if the maximum and minimum sampled values of at least one of the received signals spans the upper and lower control limits for that received signal, (a) a variance value is derived for each of the received signals for the predetermined time, (b) two of the received signals having derived variance values that are a selected one of larger and smaller than the variance values of the remaining received signals are identified, (c) a ratio of the derived variance values of the two of the identified signals is compared with a first relative size factor, and (d) if the ratio exceeds the relative size factor, one of the two identified received signal having a variance value that is furthest in magnitude from the remainder of the variance values is marked as an outlier.

Finally, the status classification is determined from the received signals in a predetermined classification process, but without the use of any received signal marked as an outlier more than a predetermined number of consecutive times.

BRIEF DESCRIPTION OF THE DRAWINGS

The present invention will now be described, by way of example, with reference to the accompanying drawings, in which:

FIG. 1 shows a side view of a vehicle seat equipped with a plurality of sensors responsive to a physical characteristic of an occupant.

FIG. 2 shows a downward view along lines 2—2 of FIG. 1.

FIG. 3 shows a block diagram of a vehicle restraint deployment apparatus for use with the seat of FIGS. 1 and 2.

Figure 4:
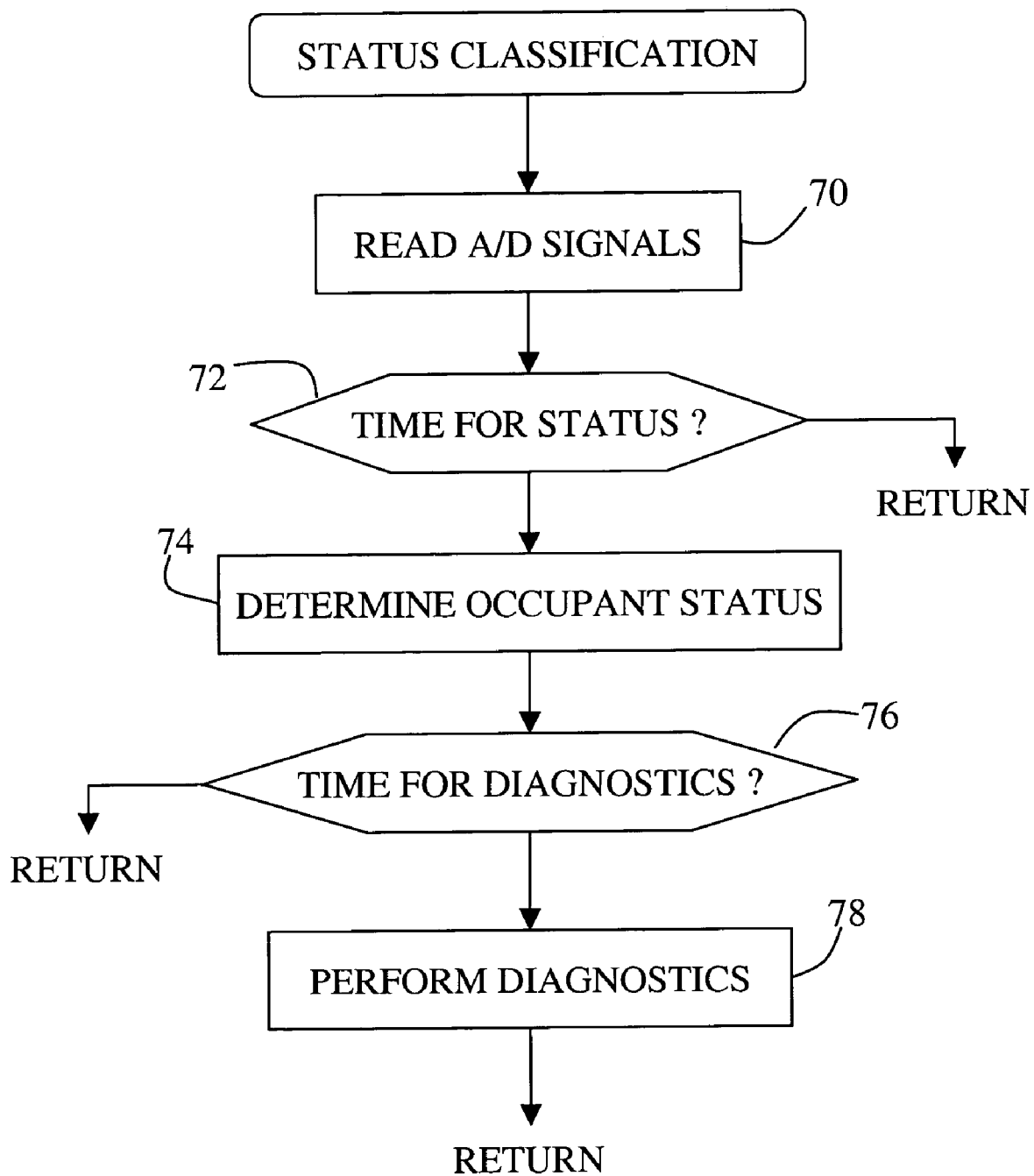
FIG. 4 shows a flow chart of a high level description of the operation of the embodiment shown in FIG. 3.

5A–5B and 6 show flow charts describing in more detail the operation of certain subroutines in the process of FIG. 4.

DESCRIPTION OF THE PREFERRED EMBODIMENT

Referring to FIGS. 1 and 2, a vehicle seat apparatus 10 comprises a seat cushion 12 and seat back 13 supported by a seat frame 14 comprising, for example, seat rails 15 and 16. A plurality of occupant characteristic sensors 20, 22, 24, 26 are provided as part of vehicle seat apparatus 10 to sense a physical characteristic, such as weight, of a mass 18 such as an occupant or an object on seat cushion 14. In the described embodiment, sensors 20, 22, 24 and 26 comprise strain gauges or similar sensors measuring the strain at four corners of the seat frame, with sensors 20 and 22 fore and aft, respectively, on left seat rail 15 and sensors 24 and 26 fore and aft, respectively, on right seat rail 16.

FIG. 3 shows a passive restraint deployment control system for seat 10 comprising an occupant detection module 40, a restraint (in this embodiment, airbag) control module 42 and a restraint 44. Modules 40 and 42 are electronic controls, preferably algorithms embodied in programs on one or more digital computers. Module 40 receives signals from occupant sensors including sensors 20, 22, 24 and 26 and determines an occupant status for seat 10. A signal based on the determined occupant status is provided by module 40 to module 42, which also receives crash signals from crash sensors, not shown, and determines if and when to deploy restraint 44 to protect the occupant of seat 10.

A preferred embodiment of the computer routine of occupant detection module 40 is shown in FIG. 4 and entitled STATUS CLASSIFICATION. The loop shown is run repeatedly at, for example, every 100 milliseconds. Beginning at step 70, the routine reads and stores A/D converted input values from the sensors, including sensors 20–26. At step 72 the routine determines if it is time to determine occupant status, which occurs, for example, once every six seconds (once every 60 loops). If not, the routine returns for the next loop. But if it is, a subroutine DETERMINE OCCUPANT STATUS is called at step 74 to perform an occupant status classification according to whatever criteria have been established. In the simplest case, only two status classifications might be established: for example (1) adult occupant and (2) child or no occupant. One known type of system derives this status classification from a sensed occupant weight; and the flow chart is written for this simple case as an illustration. But variations will occur to those skilled in the art: for example, more than two status classifications (e.g. three: adult, child or none) or classifications based on physical characteristics other than weight, such as capacitance. The subroutine will be described at a later point with reference to FIG. 6.

After determining occupant status, the routine determines at step 76 if it is time to perform diagnostics. This occurs at a lower frequency, since it involves statistical calculations requiring a significant number of input values from each sensor to detect an invalid sensor that should be ignored. In this embodiment, this will occur every 60 seconds (once every 600 loops). This function is performed at step 78 with the calling of subroutine PERFORM DIAGNOSTICS, which will be described in connection with FIGS. 5A–5B. Upon a return from this subroutine, routine STATUS CLASSIFICATION is also finished and returns for the next loop.

Figure 6:
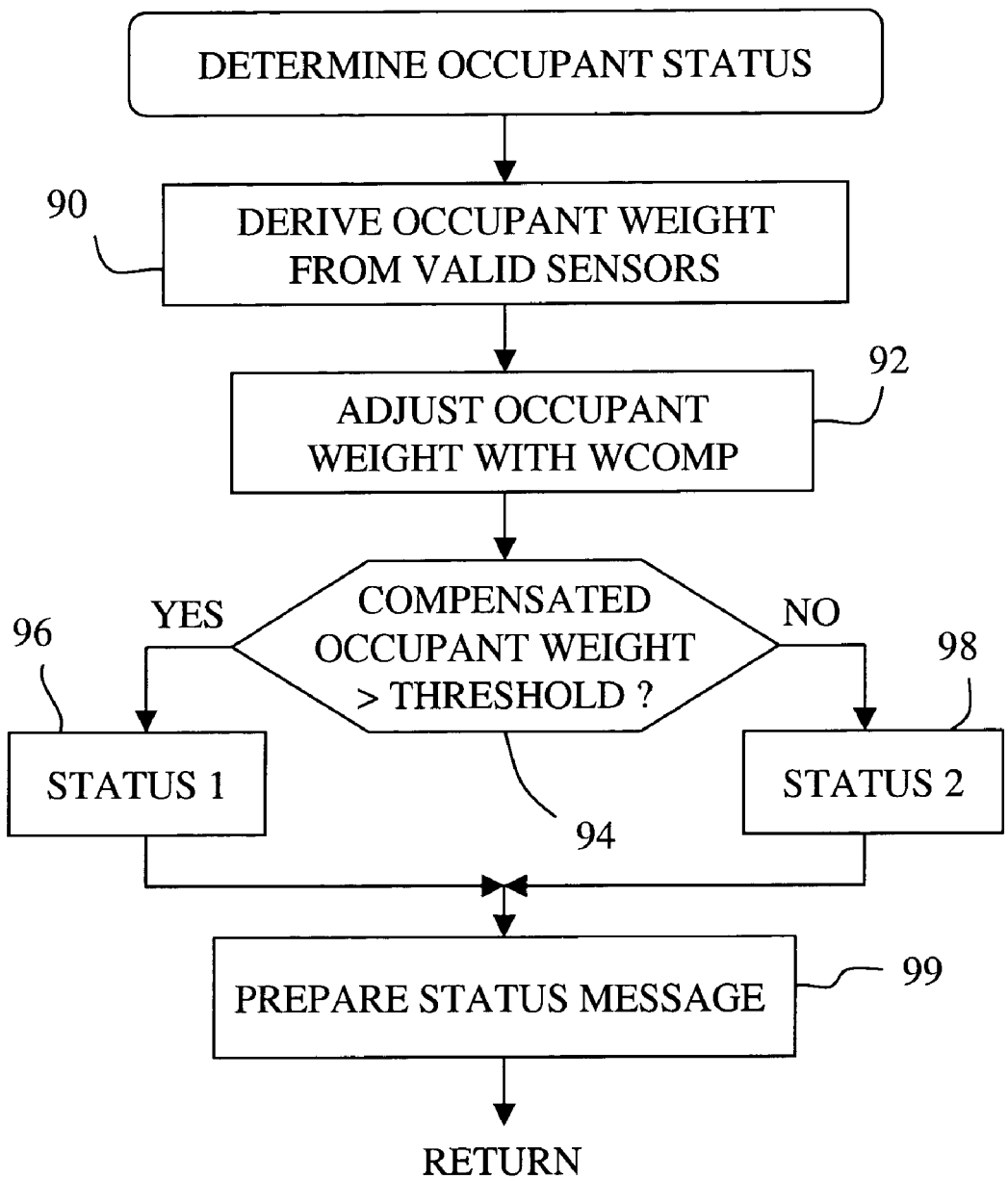

Subroutine DETERMINE OCCUPANT STATUS is shown in flow chart form in FIG. 6 for the specific embodiment of a weight based status classification, so as to fit with the example of FIGS. 2–3 using seat frame based strain sensors as occupant weight responsive sensors. Various algorithms for such weight based determination are known in the art; and the range of sensors used, in addition to the strain sensors shown herein, pressure sensor(s) in a fluid filled bladder and resistive or capacitive force responsive sensors integrated with the seat cushion or cover, among others. Beginning at step 90, an occupant weight is calculated, for example based on a computed average or other weighted sum of all valid sensor readings from sensors 20–26. Each sensor is assigned a validity flag in software that begins set valid but may be cleared to an invalid status in the PERFORM DIAGNOSTICS subroutine as described hereinafter. At step 90 only those sensors marked valid by their validity flags are used in the weight determination. At step 92, the calculated weight is adjusted for any environmental variables that might affect the sensor readings relative to their factory calibrations: such as, for example, temperature, humidity, etc.

At step 94, the adjusted calculated weight is compared with one or more stored reference values, which may also be adjusted in response to environmental variables. Depending on the result of step 94, the occupant is assigned, in a simple case, a first status at step 96 or a second status at step 98. In this embodiment, the first status would correspond to an adult occupant and would ordinarily result in allowance of restraint deployment in a crash; and the second status would correspond to a child or no seat occupant and would ordinarily result in no restraint deployment in a crash. Of course, if there are three or more occupant status possibilities defined (as described, for example, above with reference to step 74), the flow chart would be expanded to provide multiple comparisons using ranges according to the predetermined criteria. Finally, at step 99, a status message is prepared for communication to airbag control module 42.

The flow chart and process described thereby are not limited to weight based sensors. For example, some capacitive sensors are responsive to the physical capacitance of a seat occupant (rather than being weight responsive capacitive transducers) and can be used to determine an occupant's position with respect to the seat. In such a case, the subroutine would use known methods to determine the occupant's position from multiple capacitive sensors and determine whether or not the occupant is in a position appropriate for restraint deployment or one that is not.

Figure 5A:
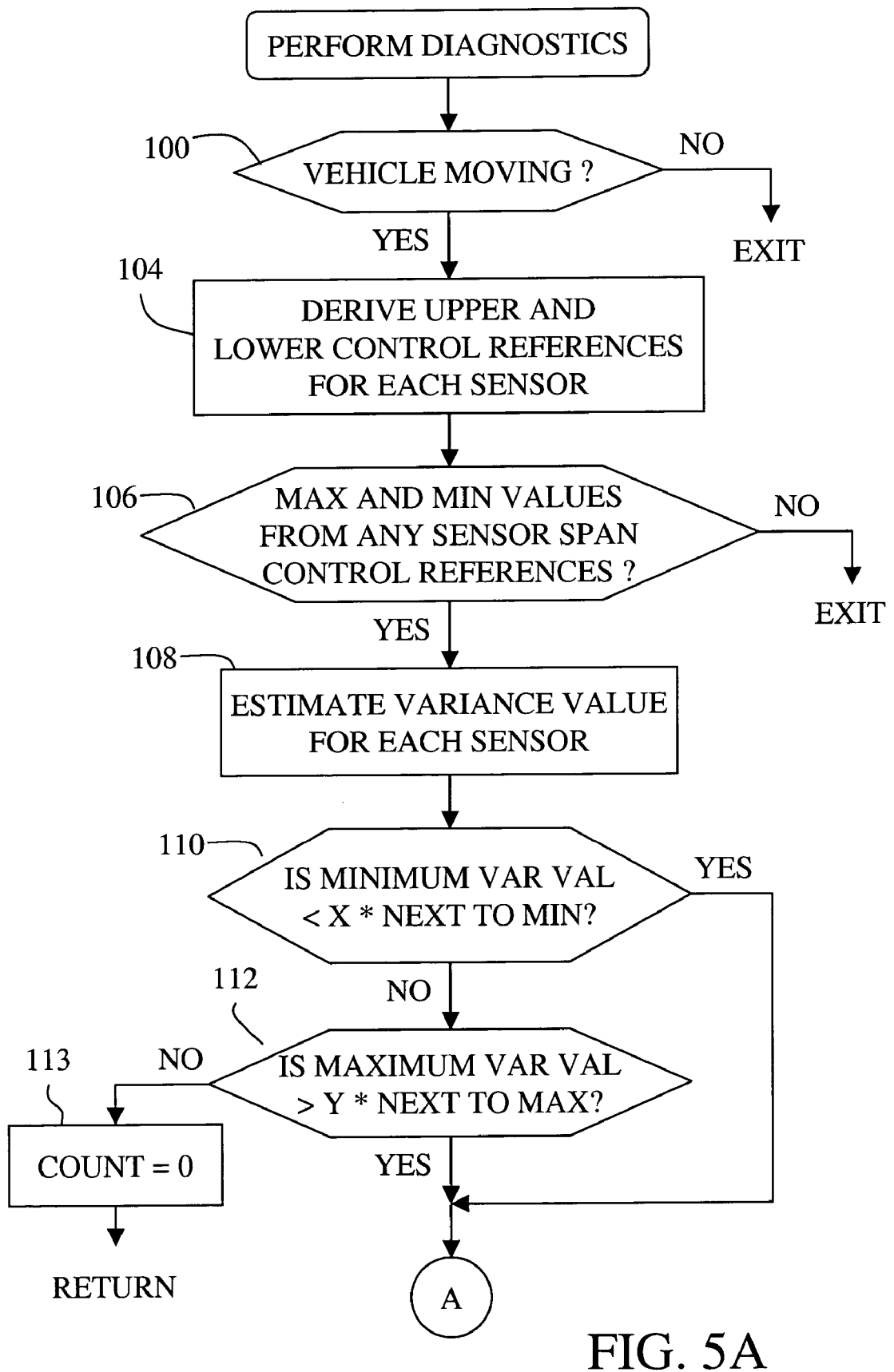
Figure 5B:
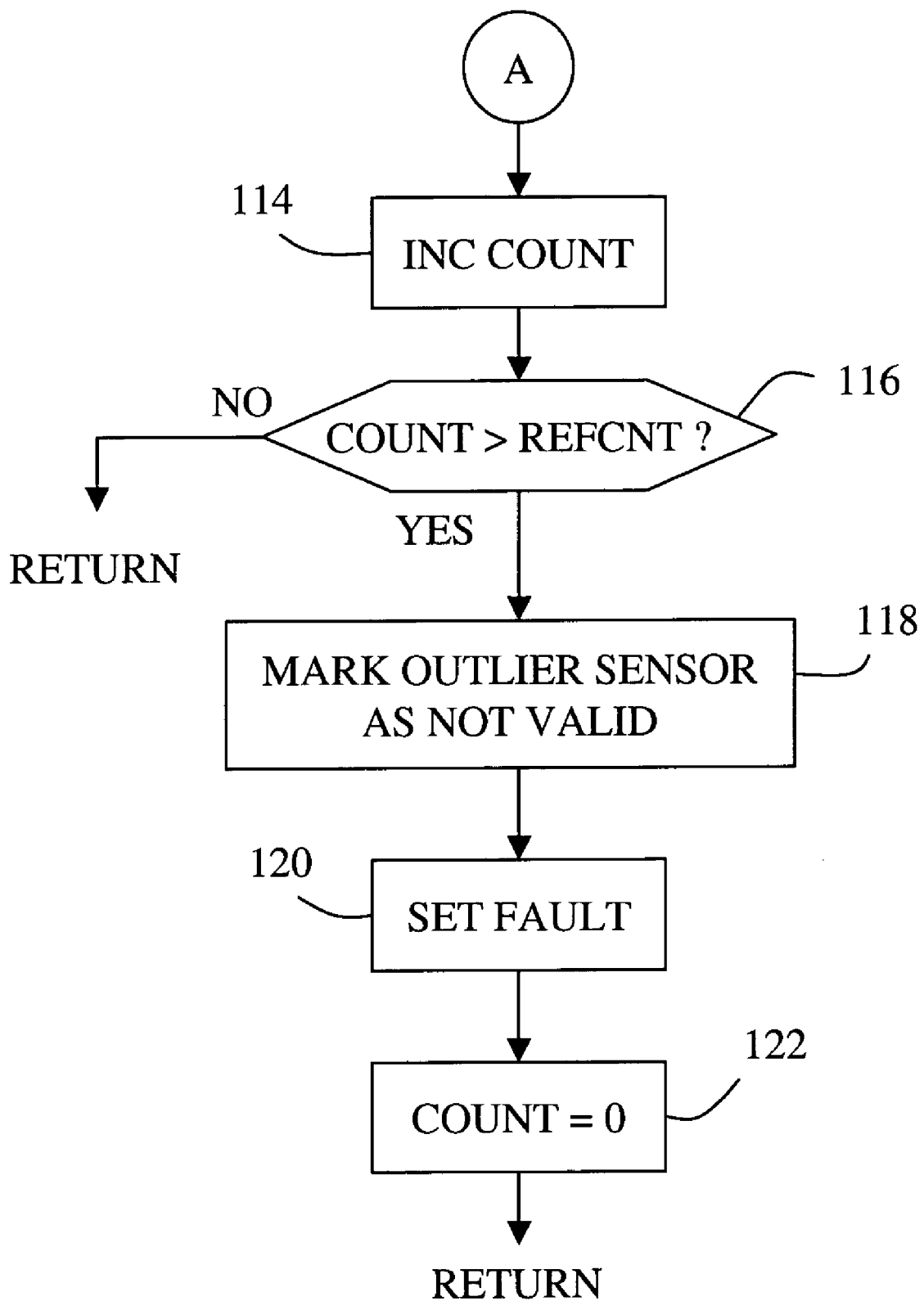

The function of subroutine PERFORM DIAGNOSTICS, introduced at step 74 above and described in detail with reference to FIGS. 5A–5B, is to determine, using certain statistical control processes which, if any, of a plurality of the sensor signals 20–26 should be at least temporarily ignored because its dynamic performance over time is not within a predetermined range of agreement with the other sensors. Beginning at step 100, FIG. 5A, the routine determines if the vehicle is moving. If it is not yet moving, there will be no dynamic variation that is meaningful to the algorithm (and also no need for determination); so the subroutine exits.

If the vehicle is moving, the subroutine continues to step 104 and derives upper and lower control references for each sensor. These are derived from the accumulated signal values from each sensor, as one would derive process control limits to distinguish normal process variations from the larger process variations due to specific causes, as in the Six Sigma (R) or similar methods. The purpose of these upper and lower control references is to help determine if there is sufficient dynamic variation due to external forces to continue with the algorithm. Thus, at step 106, the maximum and minimum ones of the accumulated values for each sensor are compared with the upper and lower control reference values, respectively, for the corresponding sensor. If, for at least one of the sensors, the maximum and minimum values span the upper and lower control references—that is, the maximum sensor value during the period exceeds the upper control limit and the minimum sensor value during the period is exceeded by the lower control limit—then there is sufficient dynamic variation from an external source; and the subroutine continues to step 108. But if this is not true for at least one of the sensors, there is insufficient dynamic variation to apply the method of this invention; and the subroutine is thus exited. This could occur if the vehicle is being driven conservatively on a very smooth road, so that little external force variation is provided to seat 10 and thus affecting the occupant responsive sensor signals.

If at least one of sensors 20–26 meets the requirements of step 106, the subroutine proceeds to step 108 and calculates an estimate of a variance value (such as the variance, the standard deviation, or either divided by a nominal or average value) for each of the sensors. The subroutine then determines at step 110 if the minimum variance value of the sensors is a factor X less than the next to minimum variance value. If not, then no minimum outlier is identified; and the subroutine at step 112 performs a mirror image of this test for the maximum variance value. If the maximum variance value of the sensors is not a factor X greater than the next to maximum variance value, subroutine clears a number COUNT at step 113 and returns, since no outlier has been found.

From either of steps 110 or 112, if the answer is yes, the subroutine continues via tab A to step 114, wherein it increments the value of COUNT. The number COUNT represents the total number of consecutive loops of the subroutine resulting in an outlier being found. Before a sensor is declared not valid, it must be found to be an outlier a predetermined number of consecutive times. The value of COUNT is next tested at step 116 against a predetermined reference REFCNT, which may be, for example, 3. If the value of COUNT does not exceed REFCNT at step 116, the subroutine returns; but if it does exceed REFCNT, the outlier sensor is marked as not valid at step 118; and a fault is registered at step 120. Finally, the value of COUNT is cleared to zero before the subroutine returns to enable tests for another sensor that is not valid.

In this manner, occupant responsive sensors having certain faults can be identified and their outputs ignored in vehicle seat occupant classification based on an occupant physical characteristic. For the frame based sensors shown in this embodiment, the types of faults detected include stuck sensors, a connection failure between the sensor and the seat frame and limits on sensor output due to items stuck under the seat system. The method can also be applied to capacitive sensing systems using sensors responsive to electric field changes induced by the proximity of an occupant. The types of failures detected include fluid spills over the system, mechanically locked plate position and loss of electrical conductivity. Pattern recognition systems having multiple sensors distributed over the surface of a seat can be improved by this invention, for several sensor technologies (capacitive, resistive, etc.). Faults detected are physically inverted or twisted sensors, mechanical or electrical interference to a sensor or group of sensors, thermal or mechanical set of a sensor and sensor lock into a foam void.

The invention claimed is:

1. A method of determining a status classification of a vehicle seat occupant comprising the steps:
   receiving signals for a predetermined time from a plurality of sensors responsive to a physical characteristic of an occupant at diverse locations on a vehicle seat apparatus;
   deriving upper and lower control reference values from the received signals;
   deriving maximum and minimum sampled values of each of the received signals during the predetermined time and comparing the derived maximum and minimum sampled values for each of the received signals to the upper and lower control reference values;
   if and only if the maximum and minimum sampled values of at least one of the received signals span the upper and lower control reference values for that received signal, performing the following steps (a) through (d):
   (a) deriving a variance value for each of the received signals for the predetermined time,
   (b) identifying two of the received signals having derived variance values that are a selected one of the largest and the smallest of the variance values of the received signals,
   (c) comparing a ratio of the derived variance values of the selected two of the identified signals with a first relative size factor,
   (d) if the ratio exceeds the relative size factor, marking as an outlier one of the two identified received signal having a variance value that is furthest in magnitude from the remainder of the variance values; and
   determining the status classification from the received signals in a predetermined classification process, but without the use of any received signal marked as an outlier more than a predetermined number of consecutive times.

2. Apparatus for determining a status classification of a vehicle seat occupant comprising:
   means for receiving signals for a predetermined time from a plurality of sensors responsive to a physical characteristic of an occupant at diverse locations on a vehicle seat apparatus;
   means for deriving maximum and minimum sampled values of each of the received signals during the predetermined time and comparing the derived maximum and minimum sampled values for each of the received signals to defined upper and lower control limits;
   means for performing the following functions (a) through (d) if and only if the maximum and minimum sampled values of at least one of the received signals spans the upper and lower control limits for that received signal:
   (a) deriving a variance value for each of the received signals for the predetermined time,
   (b) identifying two of the received signals having derived variance values that are a selected one of larger and smaller than the variance values of the remaining received signals,
   (c) comparing a ratio of the derived variance values of the two of the identified signals with a first relative size factor,
   (d) if the ratio exceeds the relative size factor, marking as an outlier one of the two identified received signal having a variance value that is furthest in magnitude from the remainder of the variance values; and
   means for determining the status classification from the received signals in a predetermined classification process, but without the use of any received signal marked as an outlier more than a predetermined number of consecutive times.

* * * * *